United States Patent
Karlsson (10) Patent No.: US 9,002,774 B2
(45) Date of Patent: Apr. 7, 2015

(54) SYSTEMS AND METHODS FOR GENERATING A FORECASTING MODEL AND FORECASTING FUTURE VALUES

(75) Inventor: Niklas Karlsson, Mountain View, CA (US)

(73) Assignee: AOL Advertising Inc., New York, NY (US)

( * ) Notice: Subject to any disclaimer, the term of this patent is extended or adjusted under 35 U.S.C. 154(b) by 315 days.

(21) Appl. No.: 13/243,193

(22) Filed: Sep. 23, 2011

(65) Prior Publication Data

US 2013/0080374 A1    Mar. 28, 2013

(51) Int. Cl.
*G06N 5/04*     (2006.01)
*G06Q 10/04*    (2012.01)

(52) U.S. Cl.
CPC ..................... *G06Q 10/04* (2013.01)

(58) Field of Classification Search
None
See application file for complete search history.

(56) References Cited

U.S. PATENT DOCUMENTS 7,606,684 B1 * 10/2009 Pierce .............................. 703/2
2010/0185499 A1 * 7/2010 Dwarakanath et al. ......... 705/10

OTHER PUBLICATIONS

De Livera, Hyndman, "Forecasting Time Series with Complex Seasonal Patterns Using Exponential Smoothing", from http://ideas.repec.org/p/msh/ebswps/2009-15.html, IDEAS is a service hosted by the Research Division of the Federal Reserve Bank of St. Louis, Dec. 2009, pp. 1-28.*
Liu, Shah, Jiang, "On-line Outlier Detection and Data Cleaning", Computers and Chemical Engineering, vol. 28, 2004, pp. 1635-1647.*
Fan and Yao, "Nonlinear Time Series: Nonparametric and Parametric Methods", Wiley & Son, inc., Boston, 2003, pp. 1-551.*
Jie Chen and Xiaoming Huo, "A Hessian Regularized Nonlinear Time Series Model (HRM)", Journal of Computational and Graphical Statistics, vol. 18, No. 3, 2009, pp. 694-716.*

* cited by examiner

*Primary Examiner* — Kakali Chaki
*Assistant Examiner* — Walter Hanchak
(74) *Attorney, Agent, or Firm* — Finnegan, Henderson, Farabow, Garrett & Dunner, LLP (57) ABSTRACT

Systems and methods are provided for generating a forecasting model based on a set of measured values. Consistent with certain embodiments, the forecasting model may include a seasonal function and a trend function. Further, consistent with other embodiments, the computer-implemented systems and methods may include computing the forecasting model by minimizing an error function representing the error between the forecasting model and the measured values. In addition, consistent with yet other embodiments, the computer-implemented systems and methods may include a process for outlier detection and removal based on a computation of residuals. Still further, consistent with some embodiments, systems and methods may be provided to filter the seasonality and/or the trend components to eliminate sudden variations in the model predictions resulting from sudden, large variations in the measurement values.

29 Claims, 7 Drawing Sheets

SYSTEMS AND METHODS FOR GENERATING A FORECASTING MODEL AND FORECASTING FUTURE VALUES

TECHNICAL FIELD

The present disclosure relates generally to the field of data processing and computer-implemented systems and methods for forecasting future values. More specifically, and without limitation, the present disclosure relates to forecasting a future value based on a set of measured values obtained over a period of time, as well as predicting a future value using a forecasting model.

BACKGROUND

Forecasting a future value typically involves deriving a mathematical model from a set of measurements taken over a period of time and using the model to forecast future values. Such forecasts are particularly useful in business, for example, to ensure that the demand for goods can be met by the existing inventory of goods or the likely volume of produced goods. A sales organization of a business may use inventory forecasts to ensure that sufficient inventory exists to meet future orders. As a further example, a delivery organization of a business may use inventory and/or other forecasts to schedule delivery of existing orders.

Over the years, techniques have been proposed to generate forecasting models based on a fixed polynomial or Fourier series variation of values over time. In most cases, model parameters are generated by minimizing the residual sum of squares based on the assumed fixed polynomial or Fourier series variation. Such models, however, fail to provide accurate forecasts of future values when the underlying measurements either have seasonal variations or when the data set containing the measurements includes extreme outliers, non stationary noise, or discontinuities.

In view of the above drawbacks, there is a need for improved systems and methods for forecasting future values, including systems and methods for generating forecasting models that can account for both seasonal variations and extreme outliers. There is also a need for improved systems and methods for generating such forecasting models by simultaneously including the most recent actual measurements or data and minimizing the computation cost of generating model parameters. In addition, there is a need for improved techniques for identifying and removing outliers from the measurements to generate a more accurate forecasting model.

SUMMARY

In accordance with the present disclosure, computer-implemented systems and methods are provided for forecasting future values. Embodiments of the present disclosure encompass systems and methods for generating a forecasting model that can account for both seasonal variations and extreme outliers. Embodiments of the present disclosure also encompass systems and methods for identifying and removing outliers in the measured values to improve the accuracy of the forecasting model. In addition, embodiments of the present disclosure encompass systems and methods for filtering the seasonal and trend components to reduce the impact of sudden changes in the measured values used to generate the forecasting model parameters.

In accordance with an exemplary embodiment, a computer-implemented method is provided for forecasting a future value. By way of example, the method comprises generating a forecasting model comprising a seasonal function representing a seasonal variation and a trend function representing a trend; minimizing a cost function including an error between a first set of values and model estimations corresponding to the first set of values computed using the forecasting model; computing, with at least one processor, model parameters comprising seasonality parameters and trend coefficients; and forecasting, with the at least one processor, the future value using the computed model parameters. In certain exemplary embodiments, the seasonal function may comprise a truncated Fourier series and the trend function may comprise a spline function. In other exemplary embodiments, the spline function may be a cubic spline function.

In accordance with another exemplary embodiment, a computer-implemented method is provided for detecting and removing an outlier. By way of example, the method comprises computing predicted values corresponding to the first set of values using the model parameters; computing residuals between the first set of values and the estimated values; computing a standard deviation of the residuals; and identifying, as an outlier, a value from the first set of values for which a residual exceeds a predetermined multiple of the standard deviation.

In accordance with still other exemplary embodiments, a method for outlier detection and removal may comprise removing a detected outlier from a first set of values to generate a second set of values; and computing model parameters based on the second set of values.

In accordance with another exemplary embodiment, a computer-implemented method is provided for forecasting a future value. By way of example, the method includes computing a seasonal component of the future value based on adjusted seasonal parameters, computing a trend component of the future value, and combining the seasonal component and the trend component to obtain the future value. In accordance with certain exemplary embodiments, the method includes computing seasonal parameters, computing a maximum permissible seasonal parameter value from the computed seasonal parameters, accessing a historical maximum permissible seasonal parameter value, adjusting the maximum permissible seasonal parameter value using a first weighting function based on the historical maximum permissible seasonal parameter value, and adjusting the seasonal parameters using a second weighting function based on the adjusted maximum permissible seasonal parameter value.

In accordance with another exemplary embodiment, a computer-implemented system is provided for forecasting a future value. By way of example, the system includes a database for storing a first set of values and a second set of values; a forecasting model generator for performing a model generation method; and a forecaster for performing a forecasting method. The model generation method of the forecasting model generator may include generating a forecasting model comprising a seasonal function representing a seasonal variation and a trend function representing a trend, minimizing a cost function including an error between the first set of values and model estimations corresponding to the first set of values computed using the forecasting model, computing model parameters comprising seasonality parameters and trend coefficients, and storing the model parameters in the database. The forecasting method of the forecaster may include accessing the model parameters from the database; and forecasting the future value using the model parameters.

In accordance with another exemplary embodiment, a computer program product is provided. By way of example, the computer program product includes executable instructions tangibly embodied in a non-transitory computer-readable medium for performing a method of forecasting a future value. The method may include generating a forecasting model comprising a seasonal function representing a seasonal variation and a trend function representing a trend, minimizing a cost function including an error between a first set of values and model estimations corresponding to the first set of values computed using the forecasting model, computing model parameters comprising seasonality parameters and trend coefficients, and forecasting the future value using the computed model parameters.

Additional objects and advantages will be set forth in part in the description which follows, and in part will be obvious from the description, or may be learned by practice of the embodiments of the present disclosure. The above and other objects and advantages will be realized and attained by means of the elements and combinations particularly pointed out in the appended claims.

It is to be understood that both the foregoing general description and the following detailed description are exemplary and explanatory only, and are not restrictive of the embodiments of the invention, as claimed.

BRIEF DESCRIPTION OF THE DRAWINGS

The accompanying drawings, which are incorporated in and constitute a part of this specification, illustrate embodiments of the present disclosure and, together with the description, serve to explain one or more principles. In the drawings.

DETAILED DESCRIPTION OF THE EMBODIMENTS

Reference will now be made in detail to the present exemplary embodiments of the present disclosure, examples of which are illustrated in the accompanying drawings. Wherever possible, the same reference numbers will be used throughout the drawings to refer to the same or like parts.

Figure 1:
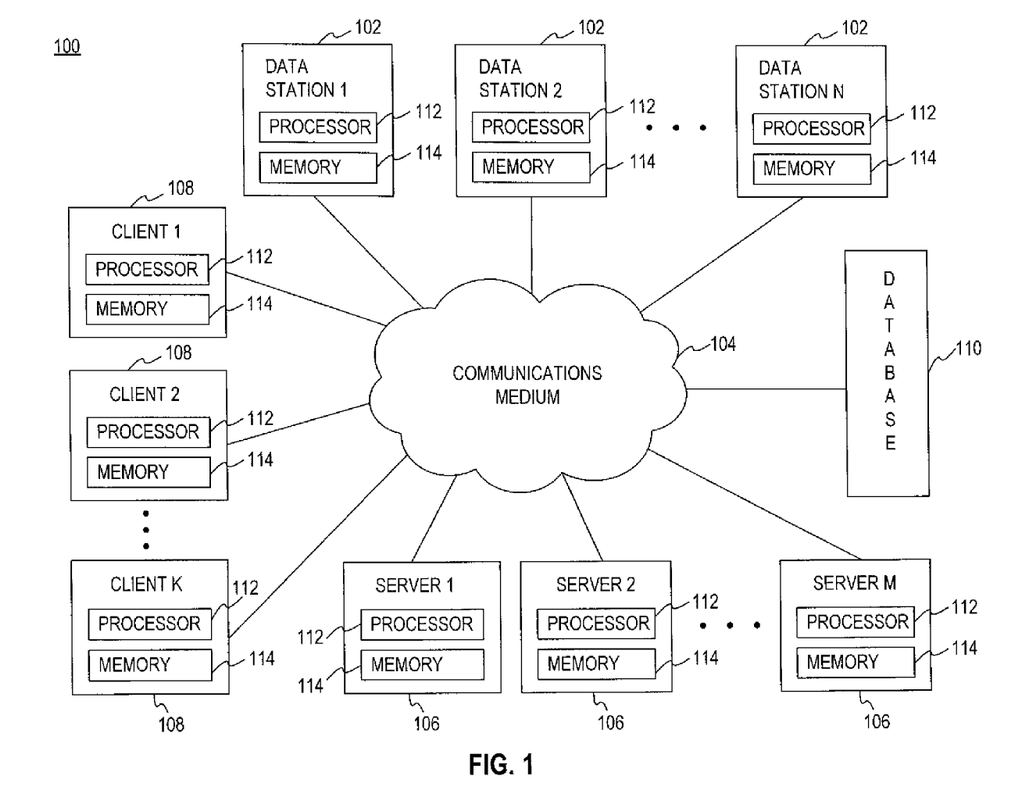
FIG. 1 shows an exemplary electronic communications system for implementing embodiments of the present disclosure.

FIG. 1 shows a block diagram of an exemplary electronic communications system 100 for implementing embodiments of the present disclosure or aspects thereof. System 100 may include one or more data collection stations, for example, data stations 102 (e.g., Data Station 1, Data Station 2, . . . Data Station N). Data stations 102 may be implemented with devices and/or applications running thereon. By way of example, data stations 102 may include personal computers, laptop computers, tablet computers, personal digital assistants, mobile telephones, point of sale terminals, inventory control terminals, and/or other types of electronic data entry or communication devices. Each data station 102 may include a processor 112, a memory 114 for storing data, and/or other storage devices (not shown), such as hard drives, NOR or NAND flash memory devices, or Read Only Memory (ROM) devices, etc. In certain embodiments, memory 114 may comprise a non-transitory computer-readable medium.

In addition, consistent with some embodiments, data stations 102 may be configured to communicate to and/or through a communications medium 104. In certain embodiments, the communications medium 104 may include any combination of communications networks. For example, the communications medium 104 may include the Internet and/or another type of wide area network, an Intranet, a metropolitan area network, a local area network, a wireless network, a cellular communications network, etc.

In some embodiments, data stations 102 may be configured to receive data, including sales data, inventory data, accounts receivable data, accounts payable data, and/or any other type of measured values or data for determining a forecasted value. Data stations 102 may receive such data from the communications medium 104. Data stations 102 may also receive such data from a variety of input sources, for example, hard drives, recordable media, memory cards, etc. In addition, data stations 102 may receive data through a keyboard or other data entry devices. Data stations 102 may transmit such data through the communications medium 104 to appropriate storage devices or databases, for example, database 110.

The database 110 may include one or more logically and/or physically separate databases configured to store data and/or other parameters. In some embodiments, database 110 may be implemented using a non-transitory computer-readable storage medium. In other embodiments, database 110 may be maintained in a network-attached storage device, in a storage area network, or combinations thereof, etc. Furthermore, database 110 may be maintained and queried using numerous types of database software and programming languages, such as SQL, MySQL, IBM DB2®, Microsoft Access®, PERL, C/C++, Java®, etc.

The database 110 may receive data from the data stations 102, servers 106, and/or clients 108 either directly or through the communications medium 104. The data stored in the database 110 may take various forms, including, but not limited to, sales data, inventory data, accounts receivable data, accounts payable data, or any other type of measured values or data, or any combination thereof. In addition, database 110 may also store data required to generate a forecasting model, model parameters for the forecasting model, and/or predictions of future values made using the forecasting model.

Servers 106 may include one or more servers (e.g., Server 1, Server 2, . . . Server M) configured to interact with the communications medium 104 and the database 110. Each server 106 may include a processor 112, a memory 114 for storing data, and/or other storage devices (not shown), such as hard drives, NOR or NAND flash memory devices, or Read Only Memory (ROM) devices, etc. In certain embodiments, memory 114 of servers 106 may comprise a non-transitory computer-readable medium. In addition, consistent with some embodiments, servers 106 may be implemented as a server, a server system comprising a plurality of servers, or a server farm comprising a load-balancing system and a plurality of servers.

Clients 108 may include one or more clients (e.g., Client 1, Client 2, . . . Client K) configured to interact with the communications medium 104 and the database 110. Each client 108 may also include a processor 112, a memory 114 for storing data, and/or other storage devices (not shown), such as hard drives, NOR or NAND flash memory devices, or Read Only Memory (ROM) devices, etc. In certain embodiments, memory 114 of clients 108 may comprise a non-transitory computer-readable medium.

Although the above description describes data stations, clients, and servers separately, clients may perform the role of servers and vice versa. Similarly, clients may perform the role of data stations and vice versa, and servers may perform the role of data stations and vice versa. Furthermore, the embodiments of this disclosure may also be implemented on the same device serving as a data station, a client, and a server.

Figure 2:
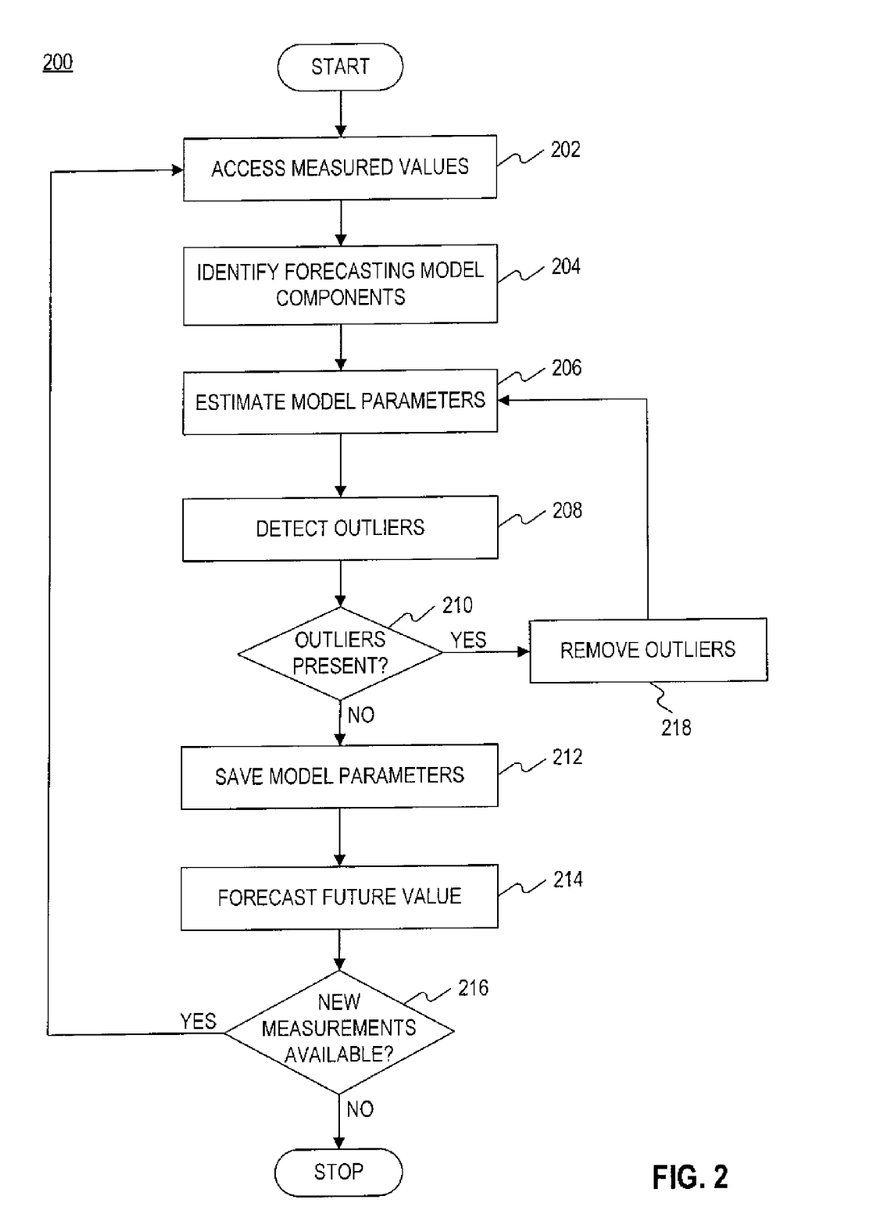
FIG. 2 shows an exemplary method of generating a forecasting model, consistent with an embodiment of the present disclosure.

FIG. 2 shows a flowchart of an exemplary method 200, consistent with an embodiment of the present disclosure. As further described below, the exemplary method of FIG. 2 may be implemented for generating a forecasting model. By way of example, method 200 may be fully implemented on any one of data stations 102, servers 106, and/or clients 108. Method 200 may also be implemented in a computer network system consisting of some or all of data stations 102, servers 106, clients 108, and/or a database 110.

As shown in FIG. 2, method 200 may include a step 202 for accessing measured values at various time points $t_i$. Further, in certain embodiments, step 202 may include performing a logarithmic transformation on the measured values. For example, a measured value $n(t_i)$ at time point $t_i$ may be converted into a corresponding transformed value $Y_i$ as:

$$Y_i = \log(n(t_i) + 1) \qquad (1)$$

Transforming the measured values in this manner may improve the ability of process 200 to handle spikes in the data. Moreover, the exemplary logarithmic transformation ensures that all forecasted values are non negative. Although Equation (1) discloses a logarithmic transformation, those skilled in the art would understand that various other types of transformations, for example, Box Cox transformations, etc. may be used instead. In certain embodiments, further processing may be performed on data comprising the transformed values instead of on the accessed measured values. For example, in certain embodiments, in step 202, the transformed values may be stored in an input buffer containing n values representing measured values only for a predetermined period of time. In certain exemplary embodiments, the value of n may be 70 or 100. Further, in certain exemplary embodiments, the n values may be the most recently obtained measured values.

As discussed above, the measured values may include sales data, inventory data, accounts receivable data, accounts payable data, or any other kind of measured data. In certain embodiments, the measured values may include non daily data or non equidistant data. Further, in certain embodiments, the measured values may be obtained every hour, every day, every week, every month, or at random times. In yet other embodiments, the measured data may include multiple periodicities or seasonality variations. A person of ordinary skill in the art would understand that the seasonality is separate from the frequency at which measured values are obtained. Thus, for example, the measured values representing daily data may contain a weekly, monthly, annual, or other types of seasonality. Accessing the measured values may involve one of data stations 102, servers 106, and/or clients 108 receiving the data through the communications medium 104. Alternatively, accessing the data may involve reading the data from memory 114 or another type of storage device of one of data stations 102, servers 106, and/or clients 108.

Method 200 may also include a step 204 for identifying the components of the forecasting model. In certain embodiments, the components of the forecasting model may include a seasonal function representing seasonal variations in the data and a trend function representing a trend in the data. In other embodiments, the forecasting model may have more than one seasonal function and/or more than one trend function to accurately model the measured values having a plurality of periodicities. Exemplary functions representing the seasonal and trend components of the forecasting model, consistent with an embodiment of the present disclosure, are further described below. As shown in FIG. 2, method 200 may also include a step 206 for estimating model parameters. In certain embodiments, estimation of model parameters may involve obtaining an optimal solution by minimizing a cost function. Exemplary embodiments for model parameter estimation are further described below.

Method 200 may also include a step 208 for detecting outlier data points in the set of measured values. Exemplary embodiments and related techniques for detecting outliers are described later in this disclosure. Method 200 may further include a step 210 for deciding whether any outlier data points are present in the measured values. If it is determined at step 210 that outlier data points are present, method 200 may proceed to step 218 to identify and remove one or more outliers from the measured values. In an exemplary embodiment, step 218 identifies and removes one or more outlier data points from the measured values. As further described below, in an exemplary embodiment, outliers may be detected by estimating the deviation of the data points from the values generated by the forecasting model. For example, data having the largest deviation from the model predictions may be identified as outliers, one or more of which may be removed from the data to generate a more accurate forecasting model. Method 200 may then return to step 206 for estimating the model parameters using a new set of data with one or more outliers removed.

If, however, it is determined in step 210 that no outlier data points are present, method 200 may proceed to a step 212 for saving the model parameters, including parameters representing seasonality, and the coefficients required to compute the short-term, intermediate-term, and long-term trend components. In certain exemplary embodiments, only a limited number of parameters, for example, seasonality parameters, and coefficients and constants required to compute the short-term, intermediate-term, and long-term trend components, may be saved in step 212 thereby reducing the storage requirements associated with the forecasting method 200. Saving the model parameters may involve saving them to the memory 114 and/or another type of storage device of one of data stations 102, servers 106, or clients 108. Alternatively, or additionally, saving the model parameters may involve saving the parameters to the database 110. Method 200 may further include a step 214 for forecasting a future value using the estimated model parameters for any desired time horizon.

As further illustrated in FIG. 2, method 200 may also include a step 216 for determining whether new measurement values are available. If it is determined at step 216 that new measurements are available, method 200 may return to step 202. If, however, it is determined at step 216 that no new measurements are available, method 200 may terminate.

As discussed above, in certain embodiments, the components of the forecasting model may include a seasonal function representing seasonal variations in the data and a trend function representing a trend in the data. By way of example, Equation (2) shows an exemplary forecasting model f(t) that may be generated consistent with the present disclosure:

$$f(t) = f_{seas}(t) + f_{trend}(t) \qquad (2)$$

where $f_{seas}(t)$ represents the seasonal function and $f_{trend}(t)$ represents the trend function.

In certain embodiments, the seasonal variation in the measured values may have an arbitrary periodicity or may have multiple periodicities representing variations over 24 hours, variations over 1 week, variations over 1 month, etc. In embodiments where the seasonal variation includes multiple periodicities, Equation (2) may include additional terms to represent each of those multiple periodicities.

In certain embodiments, the seasonal and trend functions of the forecasting model may be estimated, for example, by minimizing a cost function J(f) as:

$$J(f) = \sum_{i=1}^{n} \xi^{n-i}(y_i - f_{seas}(t_i) - f_{trend}(t_i))^2 + \qquad (3)$$

$$\lambda_1 \int_0^T (f''_{seas}(\tau))^2 \, d\tau + \lambda_2 \int_{t_{low}}^{t_{high}} (f''_{trend}(\tau))^2 \, d\tau,$$

where $\xi$ is a weighting factor, $y_i$ represents a transformed measurement value estimated using Equation (1) at time $t_i$, T represents the periodicity of the seasonal function, $t_{low}$ represents an arbitrary time point occurring before the time point corresponding to the first value used in the forecasting model computations, $t_{high}$ represents an arbitrary time point occurring after the time point corresponding to the $n^{th}$ value used in the forecasting model computations, and $\tau$ represents time. In Equation (3), the first term measures the closeness of the model to the data, while the second and third terms penalize the curvature in the seasonal and trend components of the forecasting model. Penalizing the curvature of the seasonal and trend components differently allows for robust processing of outlier data points. Thus, for example, selecting a relatively large value of $\lambda_2$ may ensure that isolated outliers do not severely affect the trend estimate. Simultaneously selecting a relatively small value of $\lambda_1$, for example, may allow for capturing a significant amount of the seasonal swings in the underlying data. Moreover, setting the value $\xi$ in Equation (3) lower than 1 may give more weight to the more recent measurements, making the model more accurate when the seasonality pattern changes over time. In certain exemplary embodiments, $\xi$, $\lambda_1$, and $\lambda_2$ may have values of 0.95, 0.5, and 0.005, respectively.

In certain embodiments, the seasonal function of the forecasting model may be represented using a truncated Fourier series. Thus, for example, Equation (4) shows an exemplary seasonal function consisting of a truncated Fourier series of arbitrary order $m_1$ and without a constant term:

$$f_{seas}(t) = \sum_{i=1}^{m_1} \left( \theta_{1,i} \sin\left(\frac{2\pi i}{T}t\right) + \theta_{1,m_1+i} \cos\left(\frac{2\pi i}{T}t\right) \right) \qquad (4)$$

The $2m_1$ terms of the Fourier series in Equation (4) can be represented in matrix form as:

$$f_{seas}(t) = N_1(t)\theta_1, \qquad (5)$$

$$N_1(t) = \begin{bmatrix} \sin\left(\frac{2\pi}{T}t\right), & \sin\left(\frac{2\pi 2}{T}t\right), & \ldots & \sin\left(\frac{2\pi m_1}{T}t\right), \\ \cos\left(\frac{2\pi}{T}t\right), & \cos\left(\frac{2\pi 2}{T}t\right), & \ldots & \cos\left(\frac{2\pi m_1}{T}t\right) \end{bmatrix} \qquad (6)$$

$$\theta_1 = \begin{bmatrix} \theta_{1,1} \\ \theta_{1,2} \\ \vdots \\ \theta_{1,2m_1} \end{bmatrix}. \qquad (7)$$

The dimension of matrix $\theta_1$ is always $2m_1 \times 1$. However, allowing t to be a sequence of n time points at which measured values may be obtained, $N_1(t)$ can be defined to be a $n \times 2m_1$ matrix where row i corresponds to time point $t_i$ as follows:

$$N_1(t) = \begin{bmatrix} \sin\left(\frac{2\pi}{T}t_1\right), & \sin\left(\frac{2\pi 2}{T}t_1\right), & \ldots & \cos\left(\frac{2\pi m_1}{T}t_1\right) \\ \sin\left(\frac{2\pi}{T}t_2\right), & \sin\left(\frac{2\pi 2}{T}t_2\right), & \ldots & \cos\left(\frac{2\pi m_1}{T}t_2\right) \\ \vdots & & & \vdots \\ \sin\left(\frac{2\pi}{T}t_n\right), & \sin\left(\frac{2\pi 2}{T}t_n\right), & \ldots & \cos\left(\frac{2\pi m_1}{T}t_n\right) \end{bmatrix}. \qquad (8)$$

In certain embodiments, the trend function of the forecasting model may be represented using a cubic spline function. Thus, for example, Equation (9) shows an exemplary trend function consisting of:

$$f_{trend}(t) = \sum_{i=1}^{n+4} \theta_{2,i} B_{i,4}(t), \qquad (9)$$

where the $B_{i,4}(t)$s are cubic B-spline basis functions defined by a knot sequence $\tau_1, \tau_2, \ldots \tau_{n+8}$ defined by:

$$\tau_1 \leq \tau_2 \leq \ldots \leq \tau_m \leq t_{low} \qquad (10)$$

$$\tau_{i+m} = t_i, \; i=1, \ldots, n \qquad (11)$$

$$t_{high} \leq \tau_{n+m+1} \leq \tau_{n+m+2} \leq \ldots \leq \tau_{n+2m}. \qquad (12)$$

where m represents a value which is one more than the order of the spline functions. Thus, for example, if cubic spline functions are used to represent the trend function, m has a value of 4. Although the above description has identified cubic spline functions, those skilled in the art would readily understand that other lower or higher order spline functions may be used to represent the trend function.

Figure 3:
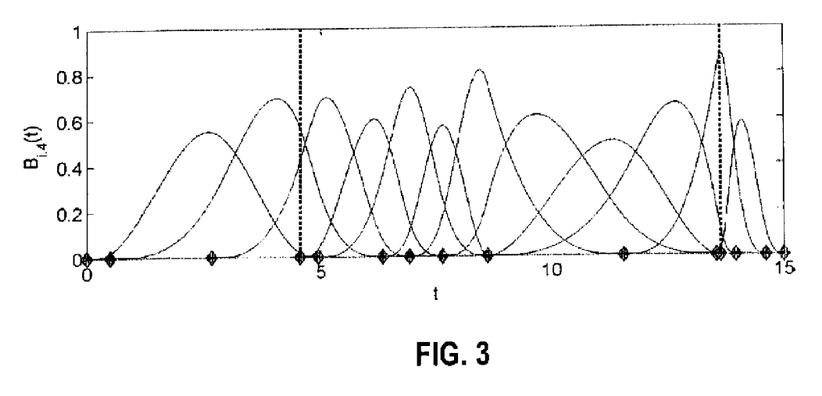
FIG. 3 shows an exemplary set of B-spline basis functions associated with a knot sequence of 16 variable distance knots in the interval 0 to 15, consistent with an embodiment of the present disclosure.
Figure 4:
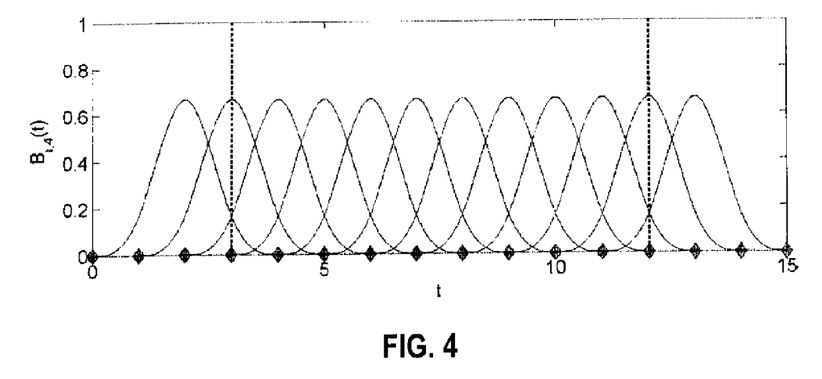
FIG. 4 shows an exemplary set of B-spline basis functions associated with a knot sequence of 16 equally spaced knots in the interval 0 to 15, consistent with an embodiment of the present disclosure.

FIG. 3 shows an exemplary set of 12 cubic B-spline basis functions associated with a knot sequence generated by selecting variable distance knots in the interval 0 and 15. To make the computation less involved, B-spline basis functions generated by equidistant knots may be used. FIG. 4 shows an exemplary set of 12 cubic B-spline basis functions associated with an equidistant knot sequence in the interval 0 and 15. The sum of n+4 terms describing $f_{trend}(t)$ with equidistant knots can be represented in matrix form as:

$$f_{trend}(t) = N_2(t)\theta_2, \quad (13)$$

where $$N_2(t) = [\ B_{1,4}(t),\ B_{2,4}(t),\ \ldots\ B_{n+4,4}(t)\ ] \quad (14)$$

and $$\theta_2 = \begin{bmatrix} \theta_{2,1} \\ \theta_{2,2} \\ \vdots \\ \theta_{2,n+4} \end{bmatrix}. \quad (15)$$

The dimension of matrix $\theta_2$ is always $(n+4)\times 1$. However, allowing t to be a sequence of n time points at which measured values may be obtained, $N_2(t)$ can be defined to be an $n\times(n+4)$ matrix where row i corresponds to time point $t_i$ as follows:

$$N_2(t) = \begin{bmatrix} B_{1,4}(t_1), & B_{2,4}(t_1), & \ldots & B_{n+4,4}(t_1) \\ B_{1,4}(t_2), & B_{2,4}(t_2), & \ldots & B_{n+4,4}(t_2) \\ \vdots & & & \vdots \\ B_{1,4}(t_n), & B_{2,4}(t_n), & \ldots & B_{n+4,4}(t_n) \end{bmatrix} \quad (16)$$

For a uniform knot sequence, the B-spline basis functions satisfy:

$$B_{i,4}(t) = B_{0,4}(t-\tau_i), \quad (17)$$

where $B_{0,4}(t)$ is defined by:

$$B_{0,4}(t) := \frac{1}{6} \begin{cases} t^3, & \text{if } 0 \leq t < 1 \\ -3(t-3)^3 - 15(t-3)^2 - \\ \quad 21(t-3) - 5, & \text{if } 1 \leq t < 2 \\ 3(t-3)^3 + 3(t-3)^2 - \\ \quad 3(t-3) + 1, & \text{if } 2 \leq t < 3 \\ (4-t)^3, & \text{if } 3 \leq t < 4 \\ 0, & \text{otherwise.} \end{cases} \quad (18)$$

Utilizing the relationship between $B_{i,4}$ and $B_{0,4}$, $N_2(t)$ may be written as:

$$N_2(t) = \begin{bmatrix} B_{0,4}(t_1-\tau_1), & B_{0,4}(t_1-\tau_2), & \ldots & B_{0,4}(t_1-\tau_{n-4}) \\ B_{0,4}(t_2-\tau_1), & B_{0,4}(t_2-\tau_2), & \ldots & B_{0,4}(t_2-\tau_{n-4}) \\ \vdots & & & \vdots \\ B_{0,4}(t_n-\tau_1), & B_{0,4}(t_n-\tau_2), & \ldots & B_{0,4}(t_n-\tau_{n-4}) \end{bmatrix} \quad (19)$$

Moreover, if measurement values are available at times $t_1, \ldots, t_n$, $N_2(t)$ may be written as:

$$N_2(t) = \begin{bmatrix} B_{0,4}(4), & B_{0,4}(3), & \ldots & B_{0,4}(1-n) \\ B_{0,4}(5), & B_{0,4}(4), & \ldots & B_{0,4}(2-n) \\ \vdots & & & \vdots \\ B_{0,4}(n+3), & B_{0,4}(n+2), & \ldots & B_{0,4}(0) \end{bmatrix} \quad (20)$$

or equivalently $$N_2(t) = \begin{bmatrix} 0 & \frac{1}{6} & \frac{4}{6} & \frac{1}{6} & 0 & \ldots & 0 & 0 & 0 & 0 \\ 0 & 0 & \frac{1}{6} & \frac{4}{6} & \frac{1}{6} & & 0 & 0 & 0 & 0 \\ 0 & 0 & 0 & \frac{1}{6} & \frac{4}{6} & & 0 & 0 & 0 & 0 \\ \vdots & & & & & & & & & \vdots \\ 0 & 0 & 0 & 0 & 0 & & \frac{4}{6} & \frac{1}{6} & 0 & 0 \\ 0 & 0 & 0 & 0 & 0 & \ldots & \frac{1}{6} & \frac{4}{6} & \frac{1}{6} & 0 \end{bmatrix}. \quad (21)$$

Using Equations (1)-(21), the seasonality parameters, $\tilde{s}_3$, and the trend components of the measured values, $\tilde{s}_4$, of the forecasting model can be obtained using the following equations:

$$\tilde{s}_3 = [\tilde{N}_1 0 \ldots 0]\hat{\theta} \quad (22)$$

$$\tilde{s}_4 = [0 \ldots 0 N_2]\hat{\theta} \quad (23)$$

$$\hat{\theta} = (N(t)^T W N(t) + \tilde{\Omega}(\lambda_1, \lambda_2))^{-1} N(t)^T W Y, \quad (24)$$

where the ~ indicates that the values in vectors $\tilde{s}_3$ and $\tilde{s}_4$ computed using Equations (22) and (23) are intermediate values and do not represent final values of the seasonality and trend parameters of the forecasting model. Moreover, in Equation (22), $\tilde{s}_3$ represents a vector containing the seasonality parameters. For example, if the data show a weekly seasonality, $\tilde{s}_3$ may contain 7 values each representing the seasonality contribution corresponding to a day of the week. Similarly, $\tilde{s}_4$ in Equation (23) represents a vector containing the estimated value of the trend component corresponding to each of the n measured values used for generating the model parameters. Further, $\tilde{N}_1$ in Equation (22) is computed from the same sequence of time stamps corresponding to the time points at which data is measured. Thus, for example, if the data has a periodicity of T, $\tilde{N}_1$ is computed from time points 1 through T. An advantage of this approach is that the $k^{th}$ value of $\tilde{s}_3$ and $s_3$ then always correspond to the $k^{th}$ time point within one period of the seasonality. A further advantage is that $\tilde{N}_1$ can be precomputed because it is primarily a mapping from the Fourier series coefficients to the sequence of time stamps that make up one period of the seasonality. The various terms comprised in Equation (24) are defined below:

$$\tilde{\Omega}(\lambda_1, \lambda_2) = \begin{bmatrix} \lambda_1 \Omega_1 & 0 \\ 0 & \lambda_2 \Omega_2 \end{bmatrix} \quad (25)$$

$$\Omega_1 = \left(\frac{2}{T}\right)^3 \pi^4 \begin{bmatrix} 1^4 & 0 & \ldots & 0 & 0 & \ldots & 0 \\ 0 & 2^4 & & 0 & 0 & & 0 \\ \vdots & & \ddots & & & & \vdots \\ 0 & 0 & & m_1^4 & 0 & & 0 \\ 0 & 0 & & 0 & 1^4 & & 0 \\ \vdots & & & & & \ddots & 0 \\ 0 & 0 & \ldots & 0 & 0 & & m_1^4 \end{bmatrix} \quad (26)$$

$$\Omega_2 = \begin{bmatrix} \frac{1}{3} & -\frac{1}{2} & 0 & \frac{1}{6} & 0 & \cdots & 0 & 0 & 0 & 0 \\ -\frac{1}{2} & \frac{4}{3} & -1 & 0 & \frac{1}{6} & \ddots & 0 & 0 & 0 & 0 \\ 0 & -1 & \frac{7}{3} & -\frac{3}{2} & 0 & \ddots & 0 & 0 & 0 & 0 \\ \frac{1}{6} & 0 & -\frac{3}{2} & \frac{8}{3} & -\frac{3}{2} & \ddots & 0 & 0 & 0 & 0 \\ \vdots & & & & & & & & & \vdots \\ 0 & 0 & 0 & 0 & 0 & \ddots & -\frac{3}{2} & 0 & \frac{1}{6} & 0 \\ 0 & 0 & 0 & 0 & 0 & \ddots & \frac{8}{3} & -\frac{3}{2} & 0 & \frac{1}{6} \\ 0 & 0 & 0 & 0 & 0 & \ddots & -\frac{3}{2} & \frac{7}{3} & -1 & 0 \\ 0 & 0 & 0 & 0 & 0 & \ddots & 0 & -1 & \frac{4}{3} & -\frac{1}{2} \\ 0 & 0 & 0 & 0 & 0 & & \frac{1}{6} & 0 & -\frac{1}{2} & \frac{1}{3} \end{bmatrix} \quad (27)$$

$$Y = \begin{bmatrix} y(t_1) \\ y(t_2) \\ \vdots \\ y(t_n) \end{bmatrix} \quad (28)$$

$$\theta = \begin{bmatrix} \theta_1 \\ \theta_2 \end{bmatrix} \quad (29)$$

$$N(t) = [\, N_1(t) \quad N_2 \,] \quad (30)$$

$$W = \begin{bmatrix} \xi^{n-1} & & & 0 \\ & \ddots & & \vdots \\ & & \xi & 0 \\ 0 & \cdots & 0 & 1 \end{bmatrix} \quad (31)$$

To ensure that the computational cost of processing measurement data does not exponentially increase over time, in certain embodiments, computations may be performed only on the n most recent measurement values. As long as the number of values n is sufficiently large, the impact on the estimation of the forecasting model parameters may be expected to be insignificant for two reasons. First, the forgetting factor ξ may be set to values less than 1 to reduce the influence of old values on the forecasting model. And, second, the spline functions used in the trend component by their very nature represent localized variations.

Figure 5:
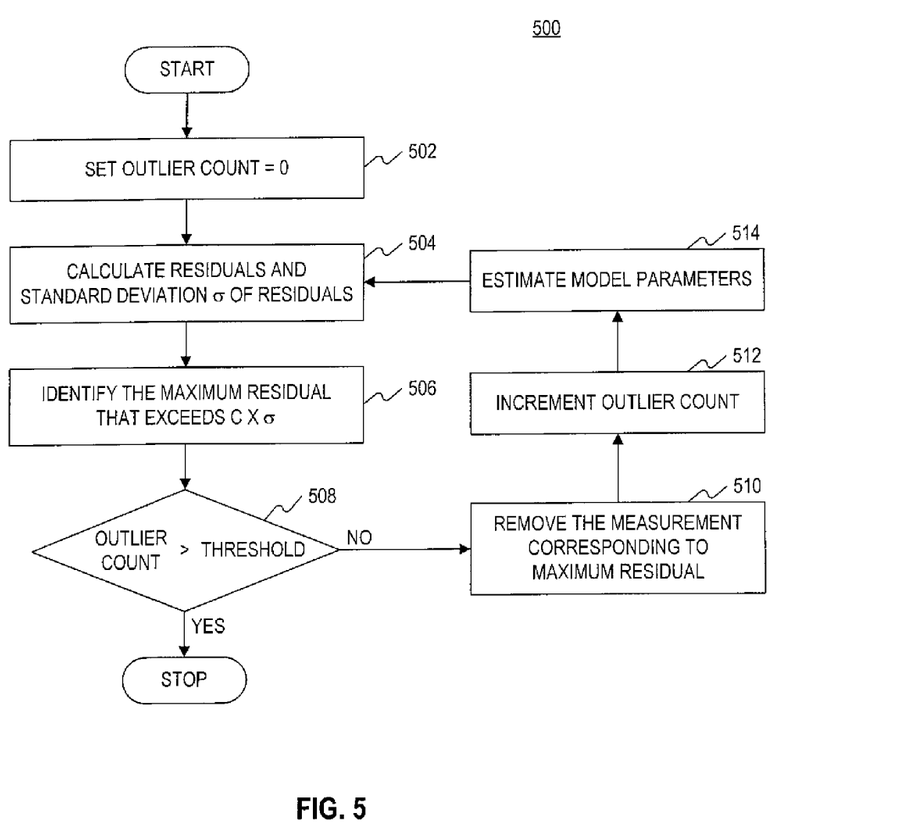
FIG. 5 shows an exemplary method of detecting and removing an outlier from the set of measured values, consistent with an embodiment of the present disclosure.

FIG. 5 shows a flowchart of an exemplary method 500, consistent with an embodiment of the present disclosure. As further described below, the exemplary method 500 of FIG. 5 may be implemented for detecting and removing outliers from the measured values to generate a more accurate forecasting model. By way of example, method 500 may be implemented on mainframe computers or back-end servers, for example, servers 106. Those skilled in the art will, however, understand from the present disclosure that method 500 may also be implemented on any one of data stations 102 and/or clients 108. Further, method 500 may be implemented in an exemplary computer network system wherein any one of data stations 102, servers 106, and/or clients 108 access data from a database 110, and store the new data set after removing outliers in database 110.

As shown in FIG. 5, method 500 may include a step 502 for initializing the outlier count to zero. Method 500 may also include a step 504 for calculating the residuals, $r(t_i)$, at each time point $t_i$ corresponding to the measured values $n(t_i)$ used for computing the model parameters of the forecasting model. In certain embodiments, the residual corresponding to time point $t_i$ may be estimated as:

$$r(t_i) = \log(n(t_i)+1) - f_{seas}(t_i) - f_{trend}(t_i). \quad (32)$$

Those skilled in the art would understand that Equation (32) applies to the case where a logarithmic transformation has been applied to the measured values and that the equation may have to be appropriately modified if other types of transformations are used to transform the measured values. In other embodiments, calculating the residuals may also include calculating a standard deviation σ of the residuals.

Method 500 may further include a step 506 for identifying measurement values having residuals that exceed a multiple, c×σ, of the standard deviation σ, where c is a predetermined scaling factor. In certain exemplary embodiments, c may have a value of 3. To prevent too many measured values from being removed as outliers, method 500 may include a check to stop detection and removal of outliers if the outlier count exceeds a threshold. Thus, for example, method 500 may include a step 508 for determining whether the outlier count exceeds a threshold. If it is determined at step 508 that the outlier count exceeds a threshold, process 500 for detecting and removing outliers may terminate. If, however, it is determined at step 508 that the outlier count does not exceed the threshold, method 500 may proceed to step 510 for removing the measurement value corresponding to the residual value exceeding c×σ. In certain embodiments, the threshold may be selected based on a predetermined percentage of the total number of measured values used for the calculations. Thus, for example, in a data set consisting of 70 values, if the threshold is chosen as 10%, a maximum of 7 outliers may be removed from the data set using method 500. Method 500 may then proceed to step 512 for incrementing the outlier count by 1. In addition, method 500 may proceed to step 514 for recalculating the model parameters as described above after removing the outlier from the set of measured values. Method 500 may then return to step 504.

Figure 6A:
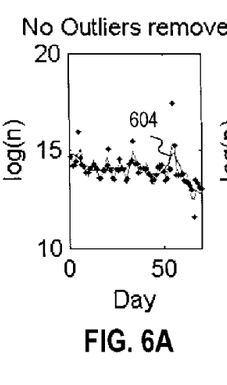
FIG. 6 shows the effect of removing outliers on the forecasting model consistent with an embodiment of the present disclosure.
Figure 6B:
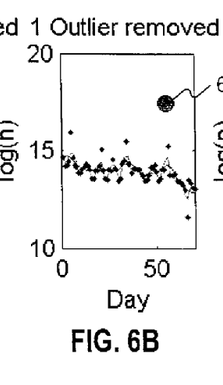
Figure 6C:
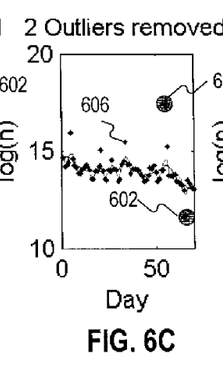
Figure 6D:
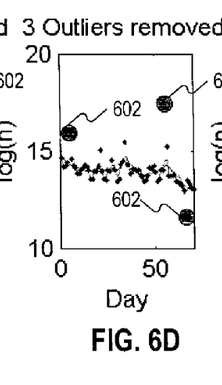
Figure 6E:
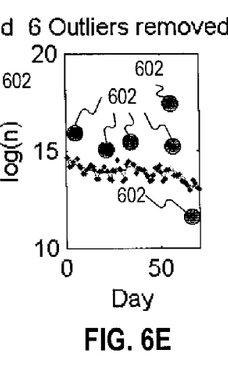

FIGS. 6A-6E illustrate, by way of example, how an exemplary forecasting model may change as a result of sequentially removing outliers. FIGS. 6A-6E include outlier data points 602, measured values 606, and the forecasting model 604. As shown in FIG. 6A, the forecasting model 604 is very volatile because the data set used to estimate the forecasting model parameters includes all the outlier data points 602. FIGS. 6B, 6C, 6D, and 6E illustrate the effect of removing 1, 2, 3, or 6 outliers on the forecasting model 604. A comparison of FIGS. 6A-6E shows that as more outlier data points 602 are removed from the measured values 606, the forecasting model 604 better approximates the seasonal and trend variations in the measured values.

Figure 7A:
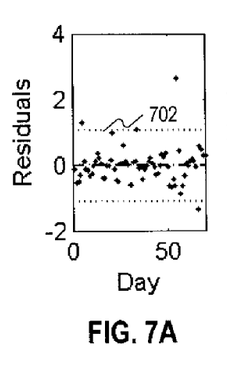
FIG. 7 shows the effect of removing outliers on the residuals, consistent with an embodiment of the present disclosure.
Figure 7B:
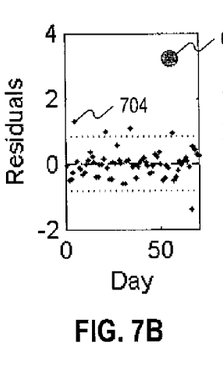
Figure 7C:
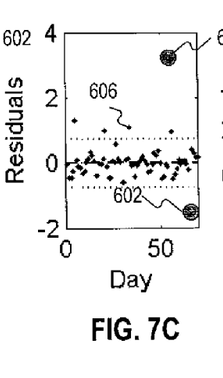
Figure 7D:
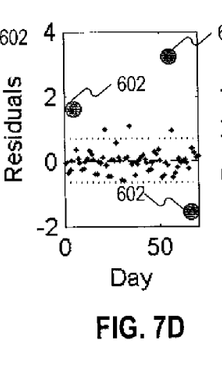
Figure 7E:
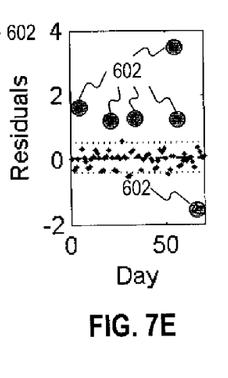

FIGS. 7A-7E, by way of example, illustrate the impact of removing the outlier data points 602 on the residuals 704. In FIGS. 7A-7E, the dotted lines 702 represent a band spanning ±c×σ of the residuals 704. FIG. 7A shows that the band 702 is very wide when none of the outlier data points 602 have been removed from the transformed values 606. A comparison of FIGS. 7A-7E shows that as more and more outlier data points 602 are removed, the residual band 702 shrinks. Thus, for example, FIG. 7E shows the narrowest residual band 702 after 6 outlier data points 602 have been removed from the data set used to estimate the forecasting model parameters. Thus, by removing the outlier data points 602, the forecasting model 604 can be tuned to more accurately represent the transformed values 606 on which it is based. Note that the outlier data points 602 are not permanently removed from the set of transformed values 606. When new measured values become available, for example, all the removed outlier data points are retrieved and included in the computation of the model parameters.

In certain embodiments, a post filter process may be implemented before storing the seasonality and trend parameters of the forecasting model. Thus, for example, a post filter process consistent with the present disclosure may be implemented before step 212 of process 200 shown in FIG. 2. The post filter process, when applied to the seasonal variation predicted by the model, ensures that the seasonal component of the forecast is not subject to sudden dramatic changes as a result of sudden changes in the data used to generate the model.

Figure 8:
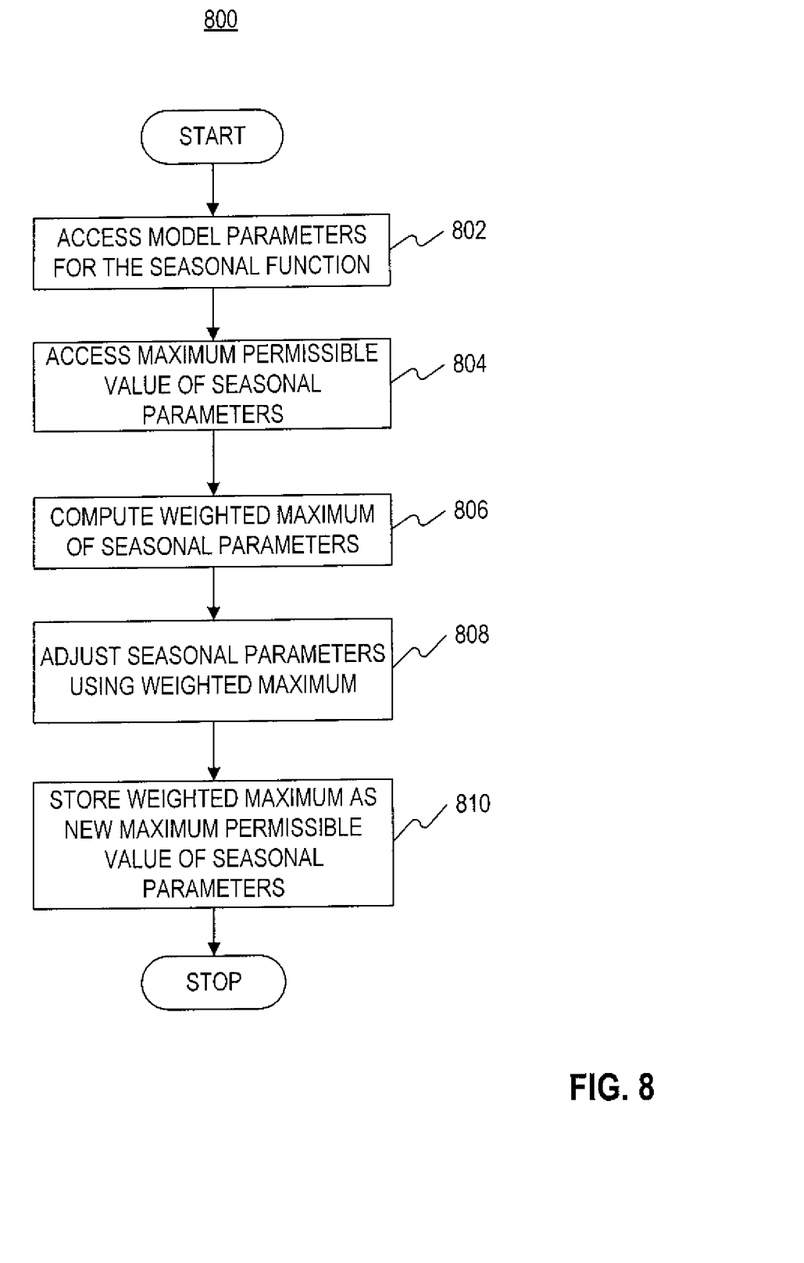
FIG. 8 shows an exemplary method of post filtering the values computed using the forecasting model, consistent with an embodiment of the present disclosure.

FIG. 8 shows a flowchart of an exemplary method 800, consistent with an embodiment of the present disclosure. As further described below, the exemplary method 800 of FIG. 8 may be implemented for post filtering the values computed at each time point $t_i$ using the forecasting model. By way of example, method 800 may be implemented on mainframe computers or back-end servers, for example, servers 106. Those skilled in the art will, however, understand from the present disclosure that method 800 may also be implemented on any one of data stations 102 and/or clients 108. Further, method 800 may be implemented in an exemplary computer network system wherein any one of data stations 102, servers 106, and/or clients 108 access data from a database 110, and store the computed data after post filtering in database 110.

As shown in FIG. 8, method 800 may include a step 802 for accessing the seasonality vector, $\tilde{s}_3$, computed, for example, using Equation (22) from database 110. In certain embodiments, method 800 may be applied to the seasonality parameters computed in step 206 of method 200 directly without first saving them in database 110. The first time method 800 is executed, $S_{max\text{-}Old}$, a value representing a maximum permissible value for any of the components of vector $\tilde{s}_3$, may be obtained by computing it as:

$$S_{max\text{-}Old} = \max(\tilde{s}_{3,i}) + c_1 \tag{33}$$

where $c_1$ is an offset factor. In certain embodiments, $c_1$ may have a value of 1.

When method 800 is executed subsequently, it may include a step 804 for accessing the old maximum permissible value, $S_{max\text{-}Old}$, based on the most recently calculated seasonality parameters, stored in the database 110. Accessing the model parameters and/or the old maximum permissible value may involve one or more of data stations 102, servers 106, and clients 108 receiving the model parameters and/or the old maximum permissible value through the communications medium 104. Alternatively, or additionally, accessing the model parameters and/or the old maximum permissible value may involve reading these data from memory 114 or another type of storage device of one of data stations 102, servers 106, and/or clients 108.

Method 800 may further include a step 806 for computing a new or updated maximum permissible value, $S_{max}$, of the seasonal parameters. In certain embodiments, the post filter process may use a weighted estimate of $S_{max}$. Thus, for example, the post filter process may include a seasonality saturation generator that prevents the value of $S_{max}$ from changing suddenly. For example, $S_{max}$ may be computed as:

$$S_{max} = \alpha_1 S_{max\text{-}Old} + (1-\alpha_1)[\min(\max_i(\tilde{s}_{3,i}), S_{max\text{-}Old}) + c_2], \tag{34}$$

where $\tilde{s}_{3,i}$ represents the value of each seasonal parameter, $S_{max\text{-}Old}$ represents the old maximum permissible value of the seasonal parameters, $\alpha_1$ represents a weighting factor and $c_2$ represents an offset factor. In certain exemplary embodiments, $\alpha_1$ may have a value of 0.9 and $c_2$ may have a value of 0.1.

Method 800 may also include a step 806 for adjusting the seasonal parameters based on the computed value of $S_{max}$. In certain embodiments, step 806 may be referred to as a seasonality filter that ensures that the seasonal parameters are not excessively influenced by sudden seasonality changes in the measured values. In an exemplary embodiment, the values of the seasonality parameters, $\tilde{s}_{3,i}$, may be adjusted as follows:

$$s'_{3,i} = \min(\tilde{s}_{3,i}, S_{max}) \tag{35}$$

$$s_{3,i} = \alpha_2 s_{3,i}^{old} + (1-\alpha_2) s'_{3,i} \tag{36}$$

where the old values of $s_{3,i}^{old}$ represent the historical values of these parameters. The first time method 800 is executed, the old values may be initialized to 0. Subsequently, Equation (36) may be used to estimate the final adjusted values of the seasonality parameters in vector $s_3$. In certain exemplary embodiments, $\alpha_2$ may have a value of 0.2. Method 800 may also include a step 810 of storing the newly computed $S_{max}$ value from step 806 as the old maximum permissible value, $S_{max\text{-}Old}$, of the seasonal parameters. While method 800 has been described in terms of the seasonal function of the forecasting model, those skilled in the art will understand from the present disclosure that a similar post filter process may be applied to the trend component of the model.

Figure 9:
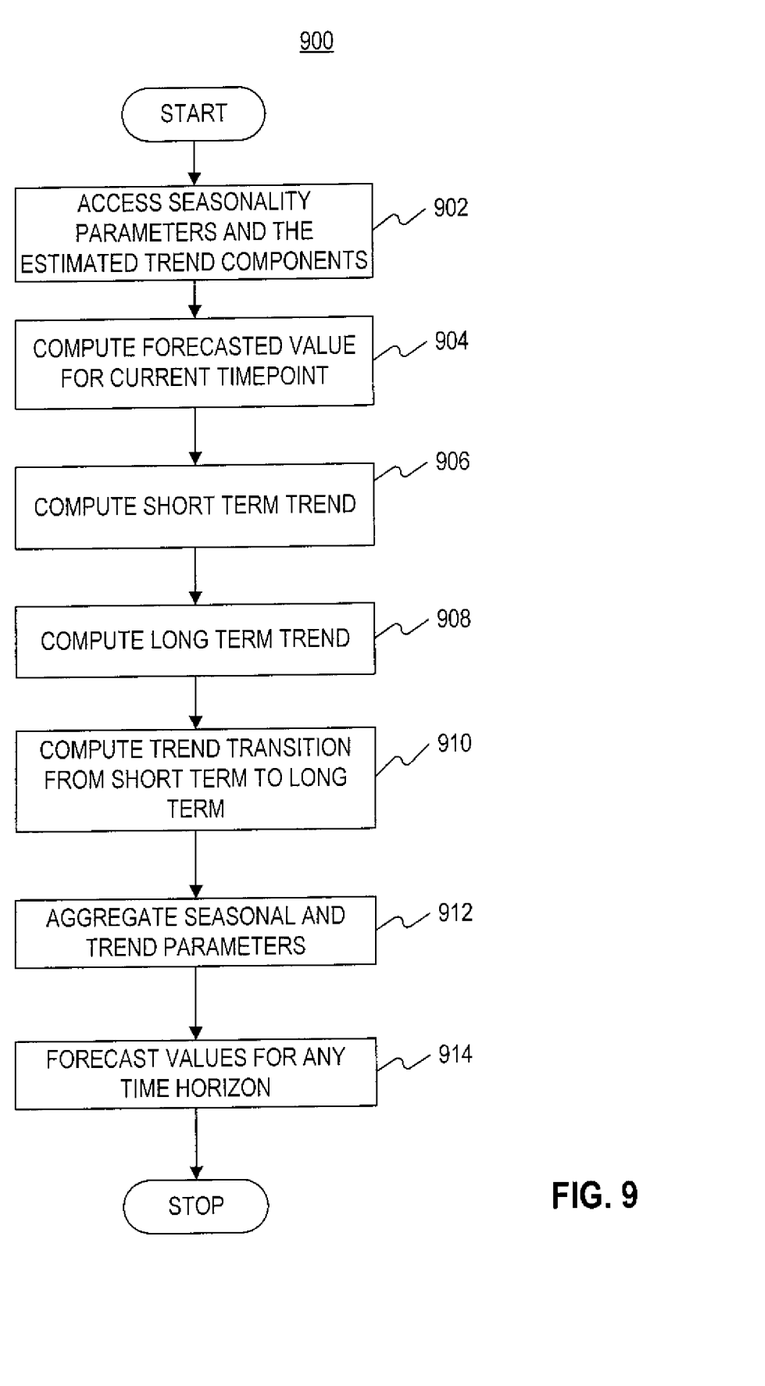
FIG. 9 shows an exemplary method of forecasting values for any desired time horizon using the forecasting model, consistent with an embodiment of the present disclosure.

FIG. 9 shows a flowchart of an exemplary method 900, consistent with an embodiment of the present disclosure. As further described below, the exemplary method of FIG. 9 may be implemented for forecasting future values for any desired time horizon. By way of example, method 900 may be implemented on front end computer systems, for example, clients 108 that may access the model parameters from database 110 to generate a forecast. Those skilled in the art will, however, understand from the present disclosure that method 900 may also be implemented on any one of data stations 102 and/or servers 106. Further, those skilled in the art will understand from the present disclosure that method 900 may be implemented in an exemplary computer network system wherein any one of data stations 102, servers 106, and/or clients 108 may access data and model parameters from a database 110, generate forecasted values, and store the forecasted values in database 110.

Method 900 may include a step 902 for accessing the seasonality parameters $s_3$ and the trend components $s_4$. Accessing these values may involve one of data stations 102, servers 106, and/or clients 108 receiving these values through the communications medium 104. Alternatively, accessing these values may involve reading the values from memory 114 or another type of storage device of one of data stations 102, servers 106, or clients 108. In other embodiments, the seasonality parameters $s_{3,i}$ and the trend components in vector $s_4$ may be obtained directly, without first storing them in database 110, as a result of methods 200 and/or 800.

Method 900 may include a step 904 for estimating the trend component of for the time point corresponding to the $n^{th}$ data point used to generate the forecasting model parameters. In certain embodiments, where very few measured values are available, the trend component of the forecasted value at for the time point corresponding to the $n^{th}$ data point may be obtained as a median of all the values in the vector $s_4$. In certain exemplary embodiments, such a median calculation may be used if the number of measured values n is less than 10. In other exemplary embodiments, where the number of measured values is sufficiently large, the trend component of the forecasted value may be obtained as a weighted average as:

$$a'_0 = \frac{\sum_{i=1}^{K} \left(\frac{i}{K+1}\right)^{\alpha_{point}-1} \left(1 - \frac{i}{K+1}\right)^{\beta_{point}-1} \hat{Y}_{N-K+i}^{trend}}{\sum_{i=1}^{K} \left(\frac{i}{K+1}\right)^{\alpha_{point}-1} \left(1 - \frac{i}{K+1}\right)^{\beta_{point}-1}} \quad (37)$$

$$a_0 = \alpha_0 a_0^{old} + (1 - \alpha_0) a'_0 \quad (38)$$

where K is an integer no larger than the number of values in the vector $s_4$ but is typically much smaller, $\hat{Y}_i$ represents a value in the vector $s_4$, $\alpha_0^{old}$ represents an old value of $\alpha_0$ based on the most recently calculated values in the vector $s_4$, and $\alpha_{point}$, $\beta_{point}$, and $\alpha_0$ are configuration parameters. The first time method 900 is executed $\alpha_0^{old}$ is initialized as the median of all the values in the vector $s_4$. After calculating $\alpha_0$, the value of $\alpha_0^{old}$ is updated with the newly calculated value of $\alpha_0$ for use in subsequent runs of method 900. The exemplary weighting scheme in Equation (38) may ensure that the trend component, $\alpha_0$, predicted for the time point corresponding to the $n^{th}$ value is neither too influenced by the last value in the vector $s_4$, nor any of the other values in the vector $s_4$ that correspond to earlier time points. In certain embodiments, K may take a value of 10, $\alpha_{point}$ may take a value of 1.4, $\beta_{point}$ may take a value of 1.2 and $\alpha_0$ may take a value of 0.4. Further, in certain embodiments, the forecasted trend component $\alpha_0$ may represent the intercept for the short-term trend function.

Method 900 may further include a step 906 for computing the slope of the short-term trend function based on a relatively small number of the most recent estimates in vector $s_4$. In certain embodiments, only the estimates corresponding to the most recent 30 time points may be used to compute the short-term trend. Additionally, in certain embodiments, that short-term trend may be obtained by performing a linear regression, non linear regression, or weighted regression on estimates stored in vector $s_4$. In certain exemplary embodiments, the slope of the short-term trend line may be computed as:

$$\tilde{\alpha}_1 = (\tilde{X}^T W \tilde{X})^{-1} \tilde{X}^T W \tilde{Y} \quad (39)$$

where, $\tilde{\alpha}_1$ represents an intermediate computed value of the slope, $$\tilde{X} = [T_{n-S+1} - T_n, T_{n-S+2} - T_n, \ldots, T_n - T_n]^T, \quad (40)$$

$$\tilde{Y} = [\hat{Y}_{n-S+1}^{trend} - a_0, \hat{Y}_{n-S+2}^{trend} - a_0, \ldots, \hat{Y}_n^{trend} - a_0]^T, \quad (41)$$

$$w_i = \left(\frac{i}{S+1}\right)^{\alpha_{short}-1} \left(1 - \frac{i}{S+1}\right)^{\beta_{short}-1}, i = 1, \ldots S, \quad (42)$$

$$W = \text{diag}(w_1, \ldots w_S), \quad (43)$$

where $T_i$ represents the time point, S represents the number of values being used to estimate the short-term trend (e.g. 30), and $\alpha_{short}$ and $\beta_{short}$ represent configuration parameters. In certain exemplary embodiments, $\alpha_{short}$ may have a value of 1.4 and $\beta_{short}$ may have a value of 1.2.

In certain embodiments, the computed value $\tilde{\alpha}_1$ may be subjected to post filtering to ensure it does not change suddenly because of sudden large variations in the measured values. Thus, for example, if the intermediate value $\tilde{\alpha}_1$ exceeds the maximum permissible value of the short-term trend slope, $\alpha_1^{max}$, then $\alpha'_1$ may be set to the maximum permissible value $\alpha_1^{max}$. If on the other hand, for example, $\tilde{\alpha}_1$ is less than the minimum permissible value of the short-term trend slope, $\alpha_1^{min}$, then $\alpha'_1$ may be set to the minimum permissible value $\alpha_1^{min}$. If $\tilde{\alpha}_1$ lies between the minimum and maximum permissible values $\alpha'_1$ may be assigned the intermediate value $\tilde{\alpha}_1$. The slope $\alpha_1$ for the short-term trend line may then be estimated using a weighted average as:

$$\alpha_1 = \alpha_1 \alpha_1^{old} + (1 - \alpha_1) \alpha'_1 \quad (44)$$

where, $\alpha_1^{old}$ represents the historical value or the most recently computed value of the slope, and $\alpha_1$ represents a weighting factor. The first time method 900 is executed, $\alpha_1^{old}$ may be initialized to 0. Once a new value of the slope $\alpha_1$ has been calculated, it may be stored as $\alpha_1^{old}$ for any future calculations of the slope $\alpha_1$. In certain embodiments, $\alpha_1$ may have a value of 0.7.

Method 900 may further include a step 908 for computing the slope and intercept of the long-term trend function based on a large number of values or all the values in vector $s_4$. In certain exemplary embodiments, the number of values used for computing the long-term trend may be 70. In certain embodiments, that long-term trend may be obtained by performing a linear regression, non-linear regression, or weighted regression on estimates stored in vector $s_4$. In certain exemplary embodiments, the intercept, $b'_0$, and the slope, $b'_1$, of the long-term trend line may be computed as:

$$\begin{bmatrix} \tilde{b}_0 \\ \tilde{b}_1 \end{bmatrix} = (\tilde{X}^T W \tilde{X})^{-1} \tilde{X}^T W \tilde{Y} \quad (45)$$

where, $\tilde{b}_0$ and $\tilde{b}_1$ represent intermediate computed values of the intercept and slope respectively, $$\tilde{X} = \begin{bmatrix} 1 & 1 & \ldots & 1 \\ T_{n-L+1} - T_n, & T_{n-L+2} - T_n, & \ldots, & T_n - T_n \end{bmatrix}^T, \quad (46)$$

$$\tilde{Y} = [\hat{Y}_{n-L+1}^{trend}, \hat{Y}_{n-L+2}^{trend}, \ldots, \hat{Y}_n^{trend}]^T, \quad (47)$$

$$w_i = \left(\frac{i}{L+1}\right)^{\alpha_{long}-1} \left(1 - \frac{i}{L+1}\right)^{\beta_{long}-1}, i = 1, \ldots L, \quad (48)$$

$$W = \text{diag}(w_1, \ldots w_L), \quad (49)$$

where $T_i$ represents the time point, L represents the number of values being used to estimate the long-term trend (e.g. 70), and $\alpha_{long}$ and $\beta_{long}$ represent configuration parameters. In certain exemplary embodiments, $\alpha_{long}$ may have a value of 1.4 and $\beta_{long}$ may have a value of 1.2.

In certain embodiments, the computed values may be subjected to post filtering to ensure that they do not change suddenly because of sudden large variations in the measured values. Thus, for example, if the intermediate value $\tilde{b}_1$ exceeds the maximum permissible value of the long-term trend slope, $b_1^{max}$, then $b'_1$ may be set to the maximum permissible value $b_1^{max}$. If on the other hand, for example, $\tilde{b}_1$ is less than the minimum permissible value of the long-term trend slope, $b_1^{min}$, then $b'_1$ may be set to the minimum permissible value $b_1^{min}$. In both these cases, the computed value of the intercept, $b'_0$, may be estimated as:

$$b'_0 = (\tilde{X}_{:,1}^T W \tilde{X}_{:,1})^{-1} \tilde{X}_{:,1}^T W (\tilde{Y} - \tilde{X}_{:,2} b'_1) \quad (50)$$

If $\tilde{b}_1$ lies between the minimum and maximum permissible values $b'_1$ may be assigned the intermediate value $\tilde{b}_1$ and $b'_0$ may be assigned the intermediate value $\tilde{b}_0$. In certain embodiments, the slope, $b_0$, and intercept, $b_1$, of the long-term trend line may then be computed as:

$$\begin{bmatrix} b_0 \\ b_1 \end{bmatrix} = \alpha_2 \begin{bmatrix} b_0^{old} \\ b_1^{old} \end{bmatrix} + (1-\alpha_2) \begin{bmatrix} b_0' \\ b_1' \end{bmatrix} \quad (51)$$

where, $b_0^{old}$ and $b_1^{old}$ represent the historical values or the most recently computed values of the intercept and slope respectively, and $\alpha_2$ represents a weighting factor. Further, when method 900 is executed for the first time, $b_0^{old}$ may be initialized to the median of the estimates in vector $s_4$ and $b_1^{old}$ may be initialized to 0. Once new values of the intercept and the slope have been calculated they may be stored in the database 110 as $b_0^{old}$ and $b_1^{old}$ respectively for any future calculations of $b_0$ and $b_1$. In certain embodiments, $\alpha_2$ may have a value of 0.7.

Method 900 may further include a step 910 for estimating a transition function between the short-term and long-term trends. The transition function allows forecasting of the trend components in intermediate time horizons that are neither too short nor too long. In certain embodiments, the transition function may be a polynomial function having a continuous slope between the short-term and long-term trend lines. Thus, for example, in certain embodiments, a polynomial function:

$$\hat{y}_{trend} = c_0 + c_1 h + c_2 h^2 + c_3 h^3 \quad (52)$$

may be used to estimate the trend component at an intermediate time horizon. In Equation (52), h represents the forecasting horizon for which a prediction is desired, and the parameters $c_0$, $c_1$, $c_2$, and $c_3$ for the polynomial function may be estimated as:

$$\begin{bmatrix} c_0 \\ c_1 \\ c_2 \\ c_3 \end{bmatrix} = A^{-1} B \begin{bmatrix} a_0 \\ a_1 \\ b_0 \\ b_1 \end{bmatrix} \quad (53)$$

where, $\alpha_0$ and $\alpha_1$ represent the intercept and slope of the short-term trend, and $b_0$ and $b_1$ represent the intercept and slope for the long-term trend. The matrices A and B in Equation (53) may be written as:

$$A = \begin{bmatrix} 1 & t_1 & t_1^2 & t_1^3 \\ 0 & 1 & 2t_1 & 3t_1^2 \\ 1 & t_2 & t_2^2 & t_2^3 \\ 0 & 1 & 2t_2 & 3t_2^2 \end{bmatrix} \quad (54)$$

$$B = \begin{bmatrix} 1 & t_1 & 0 & 0 \\ 0 & 1 & 0 & 0 \\ 0 & 0 & 1 & t_2 \\ 0 & 0 & 0 & 1 \end{bmatrix}, \quad (55)$$

where $t_1$ represents a forecasting horizon up to which the short-term trend function may be used to compute a trend component, and $t_2$ represents a forecasting horizon beyond which the long-term trend function may be used to compute the trend component.

In certain embodiments, the intercept estimated in step 904 and the slope of the short-term trend line estimated in step 906 may be used to forecast values for a short-term time horizon beginning from the present time to a forecasting horizon $t_1$. In exemplary embodiments, $t_1$ may correspond to the at most the next 10 time points. In other embodiments, the slope and intercept of the long-term trend line may be used to forecast values for a long-term time horizon larger than $t_2$. In certain exemplary embodiments, $t_2$ may correspond to time points beyond the next 100 time points.

Method 900 may further include a step 912 of aggregating and storing all the model parameters, including the seasonality parameters obtained after the post filtering process, the intercepts and slopes for the short-term, and long-term trend lines, and the polynomial coefficients needed to forecast values for intermediate time horizons. Thus, for example, for a data set having a weekly seasonality pattern, the parameters $\alpha_0$, $\alpha_1$, $t_1$, $b_0$, $b_1$, $t_2$, $c_0$, $c_1$, $c_2$, and $c_3$, and the seven seasonality parameters $s_{3,1}$, $s_{3,2}$, $s_{3,3}$, $s_{3,4}$, $s_{3,5}$, $s_{3,6}$, and $s_{3,7}$, corresponding to each of the seven days of the week, may be stored in database 110.

Method 900 may further include a step 914 for forecasting future values for any desired time horizon. For example, when the measured values demonstrate a weekly seasonality, the seasonality parameter, $\hat{y}_{seas}$, for any forecasting horizon h in the future can be obtained by determining the day of the week corresponding to "$t_n + h$" and selecting one of the seven seasonality parameters from the stored set of seasonality parameters $s_{3,1}$, $s_{3,2}$, $s_{3,3}$, $s_{3,4}$, $s_{3,5}$, $s_{3,6}$, and $s_{3,7}$. Further, the short-term trend coefficients can be used to estimate the trend component, $\hat{y}_{trend}$, for forecasting horizon h if $h < t_1$ as:

$$\hat{y}_{trend} = \alpha_0 + \alpha_1 h. \quad (56)$$

If, on the other hand, the forecasting horizon $h > t_2$, then the long-term trend coefficients can be used to estimate the trend component, $\hat{y}_{trend}$, as:

$$\hat{y}_{trend} = b_0 + b_1 h. \quad (57)$$

Additionally, if the forecasting horizon h corresponds to an intermediate time horizon such that $t_1 \leq h \leq t_2$, then the intermediate-term polynomial function can be used to estimate the trend component $\hat{y}_{trend}$, as:

$$\hat{y}_{trend} = c_0 + c_1 h + c_2 h^2 + c_3 h^3. \quad (58)$$

A seasonality component can also be estimated for the forecasting horizon h using the seasonality parameters. For example, if the measured values show a weekly seasonality, then a seasonality component, $\hat{y}_{seas}$, may be estimated by first determining the day of the week to which forecasting horizon h corresponds and assigning $\hat{y}_{seas}$ the specific value of $s_3$ corresponding to that day of the week. In certain embodiments, the seasonality component, $\hat{y}_{seas}$, and the trend component, $\hat{y}_{trend}$, may then be combined to estimate the future value at forecasting horizon h as:

$$\hat{n} = \exp(\hat{y}_{seas} + \hat{y}_{trend}). \quad (59)$$

Those skilled in the art would understand that the exponential function in Equation (59) may be used only when a logarithmic transformation is applied to the measured values and that Equation (59) would have to be appropriately modified if other non logarithmic transformations are used.

In an exemplary embodiment, the measured values for which forecasting is desired may consist of the volume of impressions of advertisements displayed on a web page. Thus, each time a particular advertisement is displayed to a user when the user accesses a web page, it may be counted as one impression. It may be desirable to generate a forecasting model to represent the impression volume data to be able to forecast the anticipated volume of impressions at a future time. Such forecasts may be useful, for example, for determining the pricing for a particular advertisement, its placement on a web page, or even to determine the hardware and/or software capacity required to deliver the anticipated volume of impressions to users at the future date. The measured values representing the volume of impressions may be collected on an hourly, daily, weekly, or monthly basis. Moreover, the measured values may demonstrate a weekly, monthly, or some other pattern of seasonality. Some or all of the methods 200, 500, 800, and 900 may be used to generate a forecasting model for the volume of impressions. The forecasting model so generated may also be used to estimate the number of impressions at a future time.

Embodiments of the present disclosure may be implemented in various environments and by various components. In certain embodiments, the exemplary methods and techniques discloser herein may be implemented on a data station, a server, a client, or in a system consisting of data stations, servers, and clients. Thus, for example, embodiments may be implemented in which a server 106 may perform, for example, steps 202 through and including 210 on the measured values stored in the database 110 by accessing the measured values from the database 110. The server 106 may also store the seasonality parameters and the coefficients for the short-term, long-term, and intermediate-term trend lines in the database 110 by performing the exemplary processes disclosed herein.

Furthermore, embodiments may be implemented in which a client 108 may have access to the database 110. In such embodiments, the client 108 may perform a method for generating a forecasting model, as well as forecasting a future value using the stored seasonality parameters and the coefficients for the short-term, long-term, and intermediate-term trend lines by performing the exemplary processes disclosed herein.

In addition, embodiments may be implemented in which a data station 102 may have access to the database 110. In such embodiments, the data station 102 may perform the entire forecasting model generation process, including forecasting a future value using the computed forecasting model parameters according to the exemplary processes disclosed herein.

Other embodiments of the disclosure will be apparent to those skilled in the art from consideration of the specification and practice of the embodiments disclosed herein. It is intended that the specification and examples be considered as exemplary only, with a true scope and spirit of the invention being indicated by the following claims.

What is claimed is:

1. A computer-implemented method for forecasting a future value of a volume of impressions for an advertisement, the method comprising:
    generating a forecasting model comprising a seasonal function representing a seasonal variation and a trend function representing a trend, the seasonal function comprising seasonality coefficients and the trend function comprising trend coefficients;
    minimizing a cost function comprising an error between a first set of values and estimated values corresponding to the first set of values computed using the forecasting model;
    computing, with at least one processor, the seasonality coefficients and the trend coefficients;
    adjusting the seasonality coefficients based on historical values of the seasonality coefficients;
    adjusting the trend coefficients based on historical values of the trend coefficients;
    forecasting, with the at least one processor, the future value using the adjusted seasonality coefficients and the adjusted trend coefficients;
    and determining, based on the future value, at least one of the pricing, placement, or hardware or software capacity required to display the advertisement.

2. The computer-implemented method of claim 1, wherein the first set of values comprises a predetermined number of most recently measured values.

3. The computer-implemented method of claim 2, wherein the first set of values comprises values obtained by transforming the measured values using a predetermined transformation.

4. The computer-implemented method of claim 3, wherein the predetermined transformation is a logarithmic transformation.

5. The computer-implemented method of claim 4, wherein the seasonal function comprises a truncated Fourier series.

6. The computer-implemented method of claim 5, wherein the trend function comprises a spline function of a predetermined order.

7. The computer-implemented method of claim 6, wherein predetermined order of the spline function is 3.

8. The computer-implemented method of claim 7, wherein the spline function comprises cubic B-spline basis functions defined by a knot sequence.

9. The computer-implemented method of claim 8, wherein the cost function includes a first curvature of the seasonal function.

10. The computer implemented method of claim 9, wherein the cost function includes a second curvature of the trend function.

11. The computer-implemented method of claim 10, wherein the first curvature is penalized using a first smoothing parameter and the second curvature is penalized using a second smoothing parameter.

12. The computer-implemented method of claim 11, further comprising:
    identifying an outlier in the first set of values;
    removing the identified outlier from the first set of values to generate a second set of values; and
    computing the seasonality coefficients and the trend coefficients based on the second set of values.

13. The computer-implemented method of claim 12, wherein identifying an outlier further comprises:
    computing estimated values corresponding to the first set of values using the seasonality coefficients and the trend coefficients;
    computing residuals between the first set of values and the estimated values;
    computing a standard deviation of the residuals; and
    identifying, as an outlier, a value from the first set of values for which a residual exceeds a predetermined multiple of the standard deviation.

14. The computer-implemented system of claim 13, wherein computing predicted values comprises
    computing seasonal parameters based on the second set of values; and
    computing a trend component based on trend coefficients computed based on the second set of values.

15. The computer-implemented method of claim 14, wherein computing seasonal parameters further comprises:
    computing a maximum permissible seasonal parameter value from the computed seasonal parameters;
    accessing a historical maximum permissible seasonal parameter value;

adjusting the maximum seasonal parameter value using a first weighting function based on the historical maximum permissible seasonal parameter value; and adjusting the seasonal parameters using a second weighting function based on the adjusted maximum permissible seasonal parameter value.

16. The computer-implemented method of claim 15, wherein forecasting the future value further comprises:

computing a seasonal component of the future value based on the adjusted seasonal parameters;

computing a trend component of the future value; and combining the seasonal component and the trend component.

17. The computer-implemented method of claim 16, wherein computing the trend component of the future value further comprises:

computing a short-term trend function using the trend components corresponding to a third set of values selected from the first set of values;

computing a long-term trend function using the trend components corresponding to a fourth set of values selected from the first set of values, wherein the fourth set of values are obtained after a predetermined amount of time;

computing an intermediate trend function by fitting a function between the short-term trend function and the long-term trend function, such that the function has a continuous first derivative; and computing the trend component of the future value based on the short-term trend function, the intermediate-term trend function, and the long-term trend function.

18. The computer-implemented method of claim 17, wherein the third set of values corresponds to the most recent 30 measured values.

19. The computer-implemented method of claim 18, wherein the fourth set of values corresponds to the most recent 70 values in the second set of values.

20. A computer-implemented system for forecasting a future value of a volume of impressions for an advertisement, the system comprising:

a database for storing a first set of values and a second set of values;

a forecasting model generator for performing a model generation method comprising:

generating a forecasting model comprising a seasonal function representing a seasonal variation and a trend function representing a trend, the seasonal function comprising seasonality coefficients and the trend function comprising trend coefficients;

minimizing a cost function comprising an error between the first set of values and estimated values corresponding to the first set of values computed using the forecasting model;

computing the seasonality coefficients and the trend coefficients;

adjusting the seasonality coefficients based on historical values of the seasonality coefficients;

adjusting the trend coefficients based on historical values of the trend coefficients;

and storing the adjusted seasonality coefficients and the adjusted trend coefficients in the database;

and a forecaster for performing a forecasting method comprising: accessing the adjusted seasonality coefficients and the adjusted trend coefficients from the database;

forecasting the future value using the adjusted seasonality coefficients and the adjusted trend coefficients;

and determining, based on the future value, at least one of the pricing, placement, or hardware or software capacity required to display the advertisement.

21. The computer-implemented system of claim 20, wherein the forecasting model generator comprises a server.

22. The computer-implemented system of claim 21, wherein the forecaster comprises a client.

23. The computer-implemented system of claim 22, wherein the seasonal function comprises a truncated Fourier series.

24. The computer-implemented system of claim 23, wherein the trend function comprises a spline function having a predetermined order.

25. The computer-implemented system of claim 24, wherein the spline function comprises cubic B-spline basis functions defined by a uniform knot sequence.

26. The computer-implemented system of claim 25, wherein a first curvature of the seasonal function is penalized using a first smoothing parameter and a second curvature of the trend function is penalized using a second smoothing parameter.

27. The computer-implemented system of claim 26, wherein the model generation method further comprises:

identifying an outlier in the first set of values;

removing the identified outlier from the first set of values to generate a second set of values;

storing the second set of values in the database; and computing the seasonality coefficients and the trend coefficients based on the second set of values.

28. The computer-implemented system of claim 27, wherein forecasting the future value further comprises:

computing a seasonal component of the future value based on the seasonality coefficients;

computing a trend component of the future value based on the trend coefficients; and combining the seasonal component and the trend component.

29. A computer program product comprising executable instructions tangibly embodied in a non-transitory recordable medium, which, when executed by a processor, perform a method of forecasting a future value of a volume of impressions for an advertisement, the method comprising:

generating a forecasting model comprising a seasonal function representing a seasonal variation and a trend function representing a trend;

minimizing a cost function comprising an error between a first set of values and model estimations corresponding to the first set of values computed using the forecasting model;

computing the seasonality coefficients and the trend coefficients;

adjusting the seasonality coefficients based on historical values of the seasonality coefficients;

adjusting the trend coefficients based on the historical values of the trend coefficients;

forecasting the future value using the adjusted seasonality coefficients and the adjusted trend coefficients;

and determining, based on the future value, at least one of pricing, placement, or hardware or software capacity required to display the advertisement.

* * * * *